(12) United States Patent
Hung et al.

(10) Patent No.: US 8,787,589 B2
(45) Date of Patent: Jul. 22, 2014

(54) ELECTRONIC DEVICE AND SYSTEM AND METHOD THEREOF FOR IDENTIFYING ELECTRONIC ACCESSORY AND CONTROLLING ELECTRONIC DEVICE

(75) Inventors: Ching Chung Hung, Taoyuan County (TW); Hsiu Hung Chou, Taoyuan County (TW); Chia Wei Hsu, Taoyuan County (TW)

(73) Assignee: HTC Corporation, Taoyuan County (TW)

(*) Notice: Subject to any disclaimer, the term of this patent is extended or adjusted under 35 U.S.C. 154(b) by 200 days.

(21) Appl. No.: 12/876,547

(22) Filed: Sep. 7, 2010

(65) Prior Publication Data
US 2011/0057711 A1 Mar. 10, 2011

(30) Foreign Application Priority Data
Sep. 7, 2009 (TW) .............................. 098130153 A (51) Int. Cl.
*H03K 17/00* (2006.01)
*H04M 1/60* (2006.01)
*H04M 1/725* (2006.01)

(52) U.S. Cl.
CPC ........ *H04M 1/72527* (2013.01); *H04M 1/6058* (2013.01)
USPC ............................................. 381/77; 327/365

(58) Field of Classification Search
USPC ................. 381/74, 77; 327/365; 439/577
See application file for complete search history.

(56) References Cited

U.S. PATENT DOCUMENTS

| | | | | | |
|---|---|---|---|---|---|
| 3,289,016 A | * | 11/1966 | Bloom et al. | ................. | 307/116 |
| 5,305,105 A | * | 4/1994 | Heo | ............................. | 348/485 |
| 6,038,457 A | * | 3/2000 | Barkat | ....................... | 455/556.1 |

(Continued)

FOREIGN PATENT DOCUMENTS

| CN | 1980488 | 6/2007 |
|---|---|---|
| CN | 101137211 | 3/2008 |
| GB | 2443976 | 5/2008 |
| KR | 20040003256 | 1/2004 |
| KR | 20040003256 A | 1/2004 |
| KR | 20040078518 | 9/2004 |
| KR | 20040103201 | 12/2004 |
| TW | 589527 B | 6/2004 |
| TW | I229478 | 3/2005 |
| TW | 200700995 | 1/2007 |
| WO | 0165827 | 9/2001 |
| WO | 0184809 | 11/2001 |
| WO | 04001552 | 12/2003 |
| WO | 2004057711 | 7/2004 |
| WO | 2005004148 | 1/2005 |
| WO | 2006045617 A2 | 5/2006 |
| WO | 2008064514 | 6/2008 |

OTHER PUBLICATIONS

Extended European Search Report for EP10188396.5 mailed Jun. 14, 2011.

*Primary Examiner* — Vivian Chin
*Assistant Examiner* — Leonard M Giannone
(74) *Attorney, Agent, or Firm* — Lowe Hauptman & Ham, LLP (57) ABSTRACT

An electronic device connectable with an electronic accessory according to the present disclosure is provided. The electronic device includes a jack, a data signal transceiving unit, a measuring unit, a switching unit and a processing unit. The jack is adapted to receive an insertion of a plug of the electronic accessory and has a first contact terminal adapted to be in contact with a first contact of the plug. The data signal transceiving unit is adapted to transmit to or receive from the electronic accessory a data signal through the first contact terminal of the jack. The measuring unit is adapted to measure a parameter resulted from the contact of the first contact terminal of the jack with the first contact of the plug through the first contact terminal when the plug is inserted into the jack. The switching unit is adapted to selectively connect the first contact terminal of the jack electrically to the data signal transceiving unit or the measuring unit. The processing unit executes a corresponding function according to the measured parameter when the measured parameter has a first predetermined value.

9 Claims, 5 Drawing Sheets

(56) References Cited

U.S. PATENT DOCUMENTS

| | | | |
|---|---|---|---|
| 6,856,046 B1* | 2/2005 | Scarlett et al. | 307/125 |
| 7,241,179 B2* | 7/2007 | Chennakeshu | 439/668 |
| 7,697,697 B2* | 4/2010 | Su et al. | 381/74 |
| 2003/0144040 A1* | 7/2003 | Liu et al. | 455/568 |
| 2004/0041911 A1* | 3/2004 | Odagiri et al. | 348/207.1 |
| 2004/0080440 A1* | 4/2004 | Su et al. | 341/141 |
| 2004/0198442 A1* | 10/2004 | Chan et al. | 455/557 |
| 2004/0230733 A1* | 11/2004 | Yan | 710/305 |
| 2005/0078935 A1* | 4/2005 | Sun | 386/46 |
| 2008/0164994 A1* | 7/2008 | Johnson et al. | 340/533 |
| 2008/0305676 A1* | 12/2008 | Fiennes | 439/489 |
| 2008/0318629 A1* | 12/2008 | Inha et al. | 455/557 |
| 2009/0179768 A1* | 7/2009 | Sander et al. | 340/825.73 |

\* cited by examiner

ELECTRONIC DEVICE AND SYSTEM AND METHOD THEREOF FOR IDENTIFYING ELECTRONIC ACCESSORY AND CONTROLLING ELECTRONIC DEVICE

CROSS REFERENCE TO RELATED APPLICATION

This application claims the priority benefit of Taiwan Patent Application Serial Number 098130153 filed Sep. 7, 2009, the full disclosure of which is incorporated herein by reference.

BACKGROUND OF THE INVENTION

1. Field of the Invention

The invention relates to an electronic device and an electronic system, and more particularly, to an electronic device and an electronic system and the method thereof for identifying an electronic accessory and controlling the electronic device.

2. Description of the Related Art

Nowadays, many portable electronic devices, such as mobile phones and PDAs are all equipped with a 2.5 or 3.5 mm standard audio jack so as to output audio data signals to earphones or speakers. A user can also use the microphones attached to the earphones to input voice data signals to the electronic devices. Furthermore, the present mobile phones can be used to play music besides making phone calls. When a user uses the above mobile phone to play music, it is usually required to make a touch on the buttons or touch screen of the mobile phone in order to adjust volume or select music. However, the mobile phone is not always held in the user's hand, for example, the mobile phone is put in the user's bag and the earphones extend out of the bag when the user is listening to the music. Therefore, the user needs to take out the mobile phone from the bag when he or she would like to adjust volume or select music. This is very inconvenient for the user.

SUMMARY OF THE INVENTION

An electronic device and an electronic system and the method thereof for identifying an electronic accessory and controlling the electronic device according to the present disclosure are provided.

In one embodiment, the electronic device of the present disclosure is connectable with an electronic accessory and includes a jack, a data signal transceiving unit, a measuring unit, a switching unit and a processing unit. The jack is adapted to receive an insertion of a plug of the electronic accessory and has a first contact terminal adapted to be in contact with a first contact of the plug. The data signal transceiving unit is adapted to transmit to or receive from the electronic accessory a data signal through the first contact terminal of the jack when the plug is inserted into the jack. The measuring unit is adapted to measure a parameter resulted from the contact of the first contact terminal of the jack with the first contact of the plug through the first contact terminal when the plug is inserted into the jack. The switching unit is adapted to selectively connect the first contact terminal of the jack electrically to the data signal transceiving unit or the measuring unit. The processing unit is electrically connected to the measuring unit and executes a corresponding function according to the measured parameter when the measured parameter has a first predetermined value.

According to the electronic device of the present disclosure, the electronic accessory has at least one switch button and the measuring unit measures the parameter when the switch button is pressed.

The electronic device of the present disclosure further includes an insertion detecting unit electrically connect to the processing unit. The insertion detecting unit is adapted to detect the insertion of the plug into the jack. When the insertion detecting unit detects the insertion of the plug into the jack, it will generate a control signal and transmit the control signal to the processing unit. The processing unit controls the switching unit according to the control signal so as to electrically connect the first contact terminal of the jack to the measuring unit.

The electronic device of the present disclosure further includes an audio output unit adapted to output an audio data signal. The jack further has a second contact terminal adapted to be in contact with a second contact of the plug. The audio output unit outputs the audio data signal to the electronic accessory through the second contact terminal of the jack.

According to the electronic device of the present disclosure, the data signal transmitted or received by the data signal transceiving unit is a voice data signal, music data signal or video data signal.

According to the electronic device of the present disclosure, the parameter is a voltage, a resistance or a current. The measuring unit is further adapted to convert the measured parameter into a digital value and the processing unit executes the corresponding function according to the digital value.

According to the electronic device of the present disclosure, the corresponding function is ending playing, muting, holding, volume down, volume up, reverse, forward, playing, pausing, answering phone call or hanging up phone call.

According to the electronic device of the present disclosure, the audio jack is a 2.5 or 3.5 standard audio jack.

The present disclosure also provides an electronic system that includes the above-mentioned electronic device and the electronic accessory for the electronic device. The electronic accessory includes a plug, a sound generating unit, a microphone and a control element. The plug has a first contact and a second contact. The control element is electrically connected to the first contact and has at least one switch button. The microphone is adapted to generate a voice data signal.

The present disclosure further provides a method of identifying an electronic accessory for an electronic device and controlling the electronic device, wherein the electronic device includes a measuring unit, a data signal receiving unit, a processing unit and a jack. The jack has a first contact terminal. The method of the present disclosure comprises the following steps. Firstly, it is detected whether a plug of the electronic accessory is inserted into the jack. When an insertion of the plug of the electronic accessory into the jack is detected, the first contact terminal of the jack is electrically connected to the measuring unit. Then, the measuring unit measures a parameter resulted from a contact of the first contact terminal with the plug. When the measured parameter has a first predetermined value, the processing unit executes a corresponding function according to the parameter. When the measured parameter has a second predetermined value, the processing unit controls the switching unit so as to electrically connect the first contact terminal of the jack to the data signal transceiving unit. Afterwards, the data signal transceiving unit transmits to or receives from the electronic accessory a data signal.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1A:
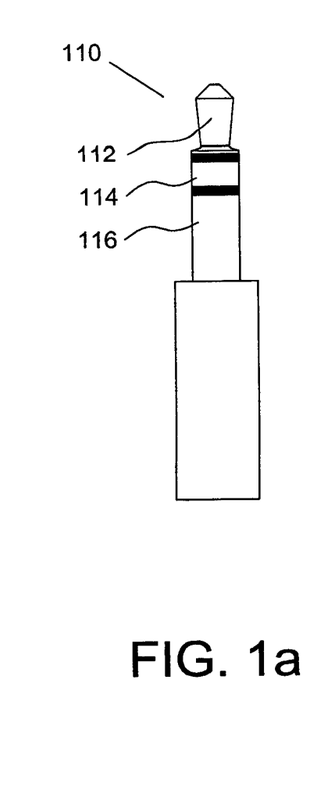
FIG. 1a is a standard plug with three contacts.
Figure 1B:
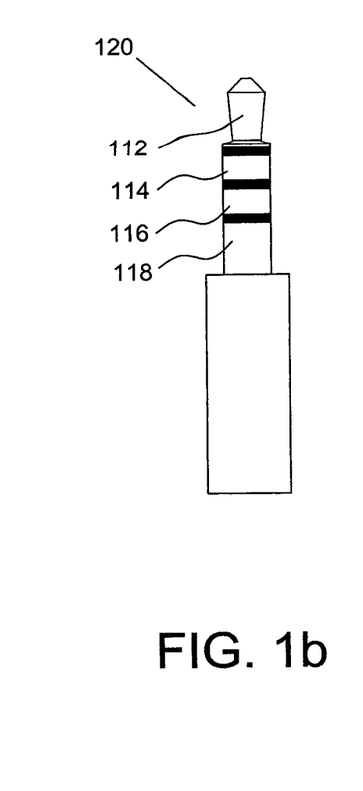
FIG. 1b is a standard plug with four contacts.

The electronic accessory, such as earphone or microphone connectable with an electronic device generally includes a 2.5 or 3.5 mm standard plug that is adapted to be inserted into an audio jack of the electronic device. Referring to FIGS. 1a and 1b, the standard audio plugs 110 and 120 include three or four contacts electrically isolated from each other. When the plug 110 or 120 is inserted into the audio jack of the electronic device, the contacts thereof will be in contact with the corresponding contact terminals of the audio jack. For example, a common earphone has a plug 110 of three contacts labeled from the tip to the end thereof in sequence as the contacts 112, 114 and 116, respectively. The contact 112 is adapted for the output of the audio left channel, the contact 114 is adapted for the output of the audio right channel, and the contact 116 is adapted for ground. In comparison with the above earphone, an earphone with microphone function has a plug 120 of four contacts 112, 114, 116, 118, and the additional contact 118 is adapted for audio input.

Figure 2:
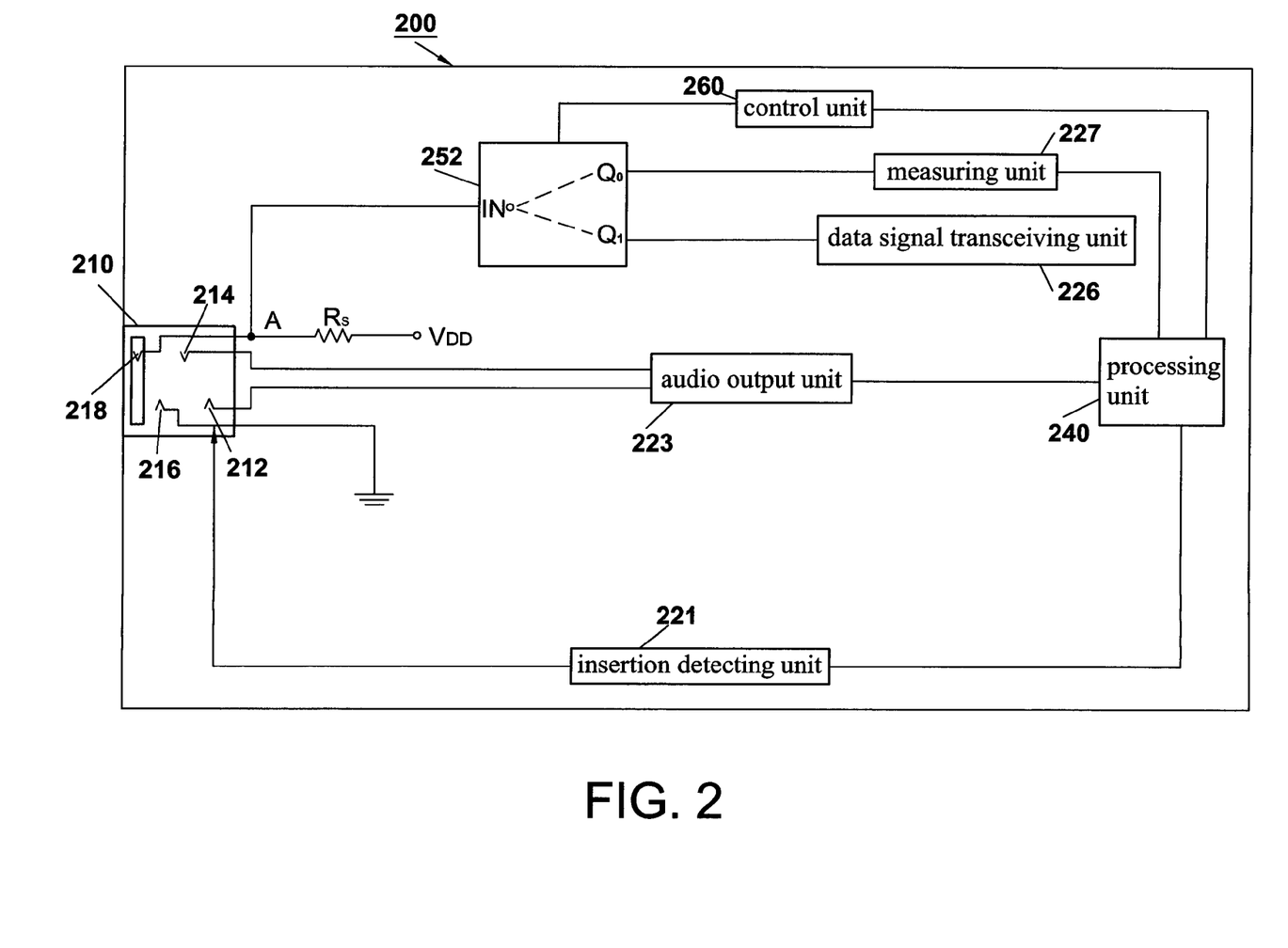
FIG. 2 is a schematic diagram of the electronic device of the present disclosure.

Referring to FIG. 2, the electronic device 200 of the present disclosure includes an audio jack 210 with four contact terminals 212, 214, 216 and 218. When the plug 120 of FIG. 1b is inserted into the audio jack 210, the contacts 112, 114, 116, 118 of the plug 120 will be in electrical contact with the contact terminals 212, 214, 216, 218 of the audio jack 210, respectively. In addition, when the plug 110 of FIG. 1a is inserted into the audio jack 210, the contacts 112 and 114 will be in electrical contact with the contact terminals 212 and 214 respectively, and the contact 116 will be in electrical contact with the contact terminals 216 and 218. The electronic device 200 further includes an insertion detecting unit 221, an audio output unit 223 in electrical connection with the contact terminals 212 and 214 of the audio jack 210, a data signal transceiving unit 226, a processing unit 240 and a switching unit 252 such as a multiplexer. In this embodiment, the data signal transceiving unit 226 may be an audio receiving unit adapted to receive a voice data signal or music data signal. Alternatively, the data signal transceiving unit 226 can be a video output/input unit adapted to output or input a video data signal. The switching unit 252 includes an input terminal IN and two output terminals Q0 and Q1. The input terminal IN is electrically connected to the contact terminal 218 of the audio jack 210. The output terminal Q0 is electrically connected to a measuring unit 227 and the output terminal Q1 is electrically connected to the data signal transceiving unit 226.

When the plug 110 of FIG. 1a or the plug 120 of FIG. 1b is inserted into the audio jack 210, the contact 116 is grounded since the contact terminal 216 is grounded, and the contact 118 of the plug 120 is in electrical connection with the input terminal IN of the switching unit 252 through the contact terminal 218. Furthermore, the contacts 112 and 114 of the plugs 110, 120 are in electrical connection with the audio output unit 223 since the contacts 112 and 114 are in contact with the contact terminals 212 and 214 of the audio jack 210 respectively. Consequently, when a control unit 260 transmits a signal to the switching unit 252 to switch the output thereof to the terminal Q0, the input terminal IN is in electrical connection with the output terminal Q0 and the contact 118 of the plug 120 or the contact 116 of the plug 110 is in electrical connection with the measuring unit 227 accordingly. Similarly, when the control unit 260 transmits a signal to the switching unit 252 to switch the output thereof to the terminal Q1, the contact 118 of the plug 120 or the contact 116 of the plug 110 is in electrical connection with the data signal transceiving unit 226.

Figure 3:
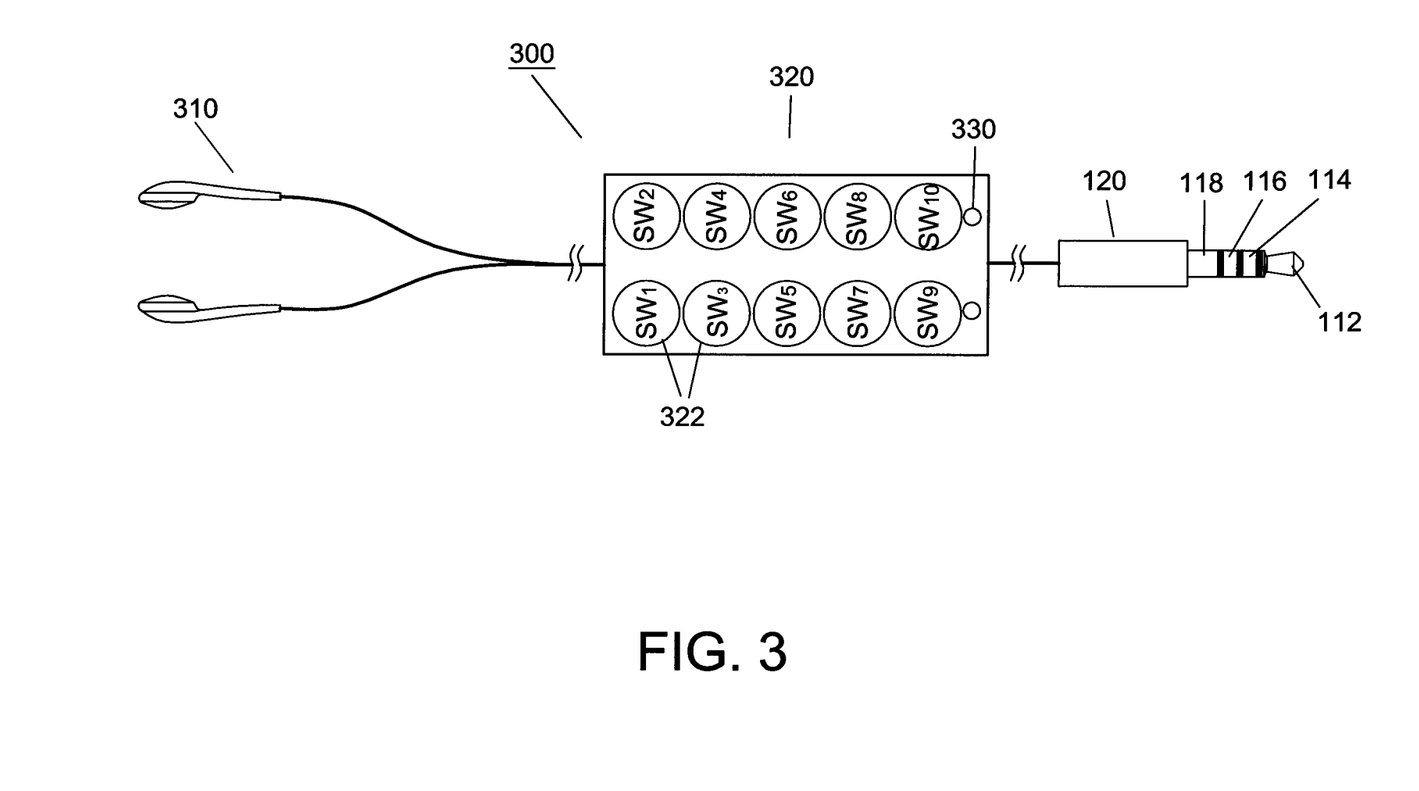
FIG. 3 is the electronic accessory connectable with the electronic device of the present disclosure.
Figure 4:
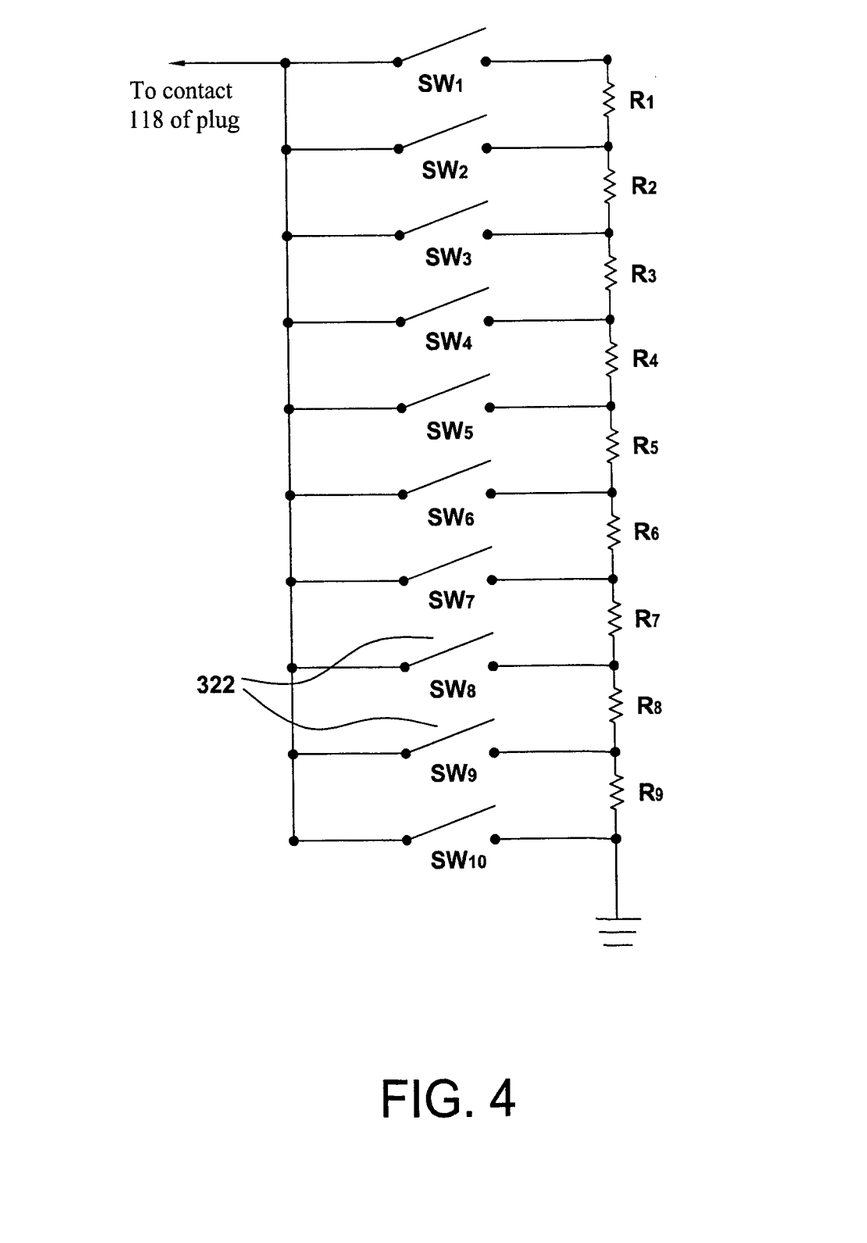
FIG. 4 illustrates the arrangement of the switches and resistors of the control element of the electronic accessory of FIG. 3.

Referring to FIG. 3, it illustrates an electronic accessory 300 connectable with the electronic device 200 of the present disclosure. The electronic accessory 300 includes at least one sound generating unit 310, such as an earphone or a speaker, the plug 120 of FIG. 1b, a control element 320 and a microphone 330 equipped in the control element 320. In other embodiments, the microphone 330 may be independent of the control element 320. The control element 320 is in electrical connection with the contacts 116 and 118 of the plug 120 and includes a plurality of switches 322, such as switch buttons. The switches 322 are connected to resistors and FIG. 4 illustrates the arrangement of these elements. When one of the switches 322 is pressed, the current will flow through different paths. For example, when the switch SW10 is pressed to switch on, the current will not flow through any resistor; and when the switch SW7 is pressed to switch on, the current will flow through only the resistors R7, R8 and R9 and not flow through other resistors.

Referring to FIG. 2 again, a resistor Rs is connected to the contact terminal 218 of the audio jack 210 in order to identify what kind of electronic accessory is inserted into the audio jack 210 and which one of the switches 322 of the electronic accessory 300 is pressed. In the embodiments of the present disclosure, an analog-to-digital converter (ADC) is used to function as the measuring unit 227 to measure the voltage to the ground applied at an end A of the resistor Rs, i.e. the voltage at the contact terminal 218 of the audio jack 210, and to convert the measured voltage into an digital value. This digital value is compared with a preset data stored in a memory of the electronic device 200 to identify what kind of electronic accessory is inserted into the audio jack 210 and which one of the switches 322 of the electronic accessory 300 is pressed (not shown in the figure). The electronic device 200 then executes corresponding application programs or functions in accordance with the digital value. Specifically, when the voltage at the end A is, for example, Vs, the resistance of the path between the contacts 116 and 118 of the plug 120 will be $(Rs \times Vs)/(V_{DD}-Vs)$ according to the voltage division theorem. In the embodiments of the present disclosure, the measuring unit 227 can be a 12-bit ADC with an output ranged from 0x000 to 0xFFF. The discussion on the electronic device and system and the method thereof for identifying an electronic accessory and controlling the electronic device is detailed in the following paragraphs.

The insertion detecting unit 221 of the electronic device 200 is electrically connected to the processing unit 240. The insertion detecting unit 221 is designed to detect whether the audio jack 210 is inserted with a plug of an electronic accessory every predetermined period of time, such as 100 ms.

When an insertion of a plug is detected, the insertion detecting unit 221 generates a control signal and transmits it to the processing unit 240. The processing unit 240 controls the switching unit 252 through the control unit 260 according to the control signal so as to electrically connect the contact terminal 218 of the audio jack 210 to the measuring unit 227. Alternatively, the insertion detecting unit 221 may be an interruption reactor. That is to say, there is no need for the insertion detecting unit 221 to detect an insertion of a plug every predetermined period of time. When the insertion detecting unit 221 detects an insertion of a plug into the audio jack 210, the control unit 260 will transmit a signal to the switching unit 252 to switch the output thereof to the terminal Q0. As a result, the contact terminal 218 of the audio jack 210 is electrically connected to the measuring unit 227 accordingly. Afterward, the voltage at the contact terminal 218 of the audio jack 210 is measured so as to identify what kind of electronic accessory is inserted into the audio jack 210 or which one of the switches 322 of the electronic accessory 300 is pressed. The electronic device 200 then executes a corresponding function according to the parameter value measured by the measuring unit 227.

Case 1: The Parameter Value Measured by the Measuring Unit 227 is 0x000

When the parameter value measured at the contact terminal 218 of the audio jack 210 by the measuring unit 227 is 0x000, i.e. a short circuit state, it is identified by the processing unit 240 that the plug 110 of FIG. 1a is inserted into the audio jack 210. Since an electronic accessory without a microphone is equipped with the plug 110 of three contacts, it is identified that the electronic accessory is one that has no microphone function. Afterward, the audio output unit 223 is activated, an audio data signal, such as voice data signal or music data signal, is outputted to the electronic accessory through the contact terminals 212, 214.

Case 2: The Parameter Value Measured by the Measuring Unit 227 is within a First Numeric Range When the parameter value measured at the contact terminal 218 of the audio jack 210 by the measuring unit 227 is within a first numeric range, it is identified by the processing unit 240 that the electronic accessory coupled with the audio jack 210 is one that has microphone function, for example, the electronic accessory 300 of FIG. 3 with the plug 120 of FIG. 1b. Afterward, the processing unit 240 switches the output of the switching unit 252 to the terminal Q1 through the control unit 260 according to the first numeric range so as to electrically connect the contact terminal 218 of the audio jack 210 to the data signal transceiving unit 226. As a result, the audio output unit 223 and data signal transceiving unit 226 are then activated, and an audio data signal, such as voice data signal or music data signal, is outputted to the sound generating unit 310 through the contact terminals 212, 214. Furthermore, a user can use the microphone 330 to input a voice data signal or music data signal to the data signal transceiving unit 226 through the contact terminal 218.

Case 3: The Parameter Value Measured by the Measuring Unit 227 is within Other Numeric Range When the electronic accessory 300 is coupled with the electronic device 200 through the plug 120 and audio jack 210, the measuring unit 227 measures the voltage at the contact terminal 218 to identify which one of the switches 322 is pressed. For example, when the switch SW7 is pressed, the current will flow through only the resistors R7, R8 and R9 and not flow through other resistors; therefore, the voltage at the contact 118 of the plug 120 measured by the measuring unit 227 through the contact terminal 218 is dependent on the resistors R7, R8 and R9. Similarly, when the switch SW5 is pressed, the current will flow through only the resistors R5, R6, R7, R8 and R9 and not flow through other resistors. In other words, the voltage measured by the measuring unit 227 is dependent on only the resistors R5, R6, R7, R8 and R9 and not on other resistors. As a result, the measuring unit 227 will measure a different parameter value when a different switch 322 is pressed. The pressed switch 322 may be identified by comparing the digital parameter value of the measuring unit 227 with the preset data stored in a memory of the electronic device 200. For this reason, the electronic device 200 can identify that the switch SW10, SW9, SW8, SW7, SW6, SW5, SW4, SW3, SW2 or SW1 is pressed when the parameter value measured by the measuring unit 227 is within a first, second, third, fourth, fifth, sixth, seventh, eighth, ninth, tenth or eleventh numeric range. Subsequently, the processing unit 240 will execute a corresponding function according to the measured parameter value. The examples of what functions the processing unit 240 will execute when the switches 322 are pressed are listed in the following paragraphs.

When the electronic device 200 executes a music playing program to play music, an audio data signal will be transmitted from the audio output unit 223 to the sound generating unit 310 of the electronic accessory 300. 1) If the switch SW10 is pressed to cause the parameter value measured by the measuring unit 227 to be within the second numeric range, the processing unit 240 will execute an end function to terminate the playing of music. 2) If the switch SW9 is pressed to cause the parameter value measured by the measuring unit 227 to be within the third numeric range, the processing unit 240 will execute a mute function to stop the transmission of the audio data signal from the audio output unit 223 to the sound generating unit 310. 3) If the switch SW8 is pressed to cause the parameter value measured by the measuring unit 227 to be within the fourth numeric range, the processing unit 240 will execute a holding function to suspend the functions of the switches 322 so that an inadvertent press on the switches 322 will not change the playing state. 4) If the switch SW7 is pressed to cause the parameter value measured by the measuring unit 227 to be within the fifth numeric range, the processing unit 240 will execute a volume down function to lower the volume of the sound generating unit 310. 5) If the switch SW6 is pressed to cause the parameter value measured by the measuring unit 227 to be within the sixth numeric range, the processing unit 240 will execute a volume up function to raise the volume of the sound generating unit 310. 6) If the switch SW5 is pressed to cause the parameter value measured by the measuring unit 227 to be within the seventh numeric range, the processing unit 240 will execute a reverse function to play the previous song. 7) If the switch SW4 is pressed to cause the parameter value measured by the measuring unit 227 to be within the eighth numeric range, the processing unit 240 will execute a forward function to play the next song. 8) If the switch SW3 is pressed to cause the parameter value measured by the measuring unit 227 to be within the ninth numeric range, the processing unit 240 will execute a play or pause function to play or pause the playing of music.

It is to be noted that the current will only flow through the path of the least resistance based on the arrangement of FIG. 4 according to the Ohm's law when two or more switches 322 are pressed simultaneously. For example, when the switches SW5 and SW7 are pressed simultaneously, the current will flow through the switch SW7 and the resistors R7, R8, R9 and not flow through the switch SW5, the resistors R5, R6. In other words, the switch SW5 will not affect the resistance of the current path, and the parameter value measured by the measuring unit 227 will be within the fifth numeric range.

Therefore, when the switches SW5 and SW7 are pressed simultaneously, the processing unit 240 will execute a volume down function, which is associated with the switch SW7 and not with switch SW5.

Figure 5:
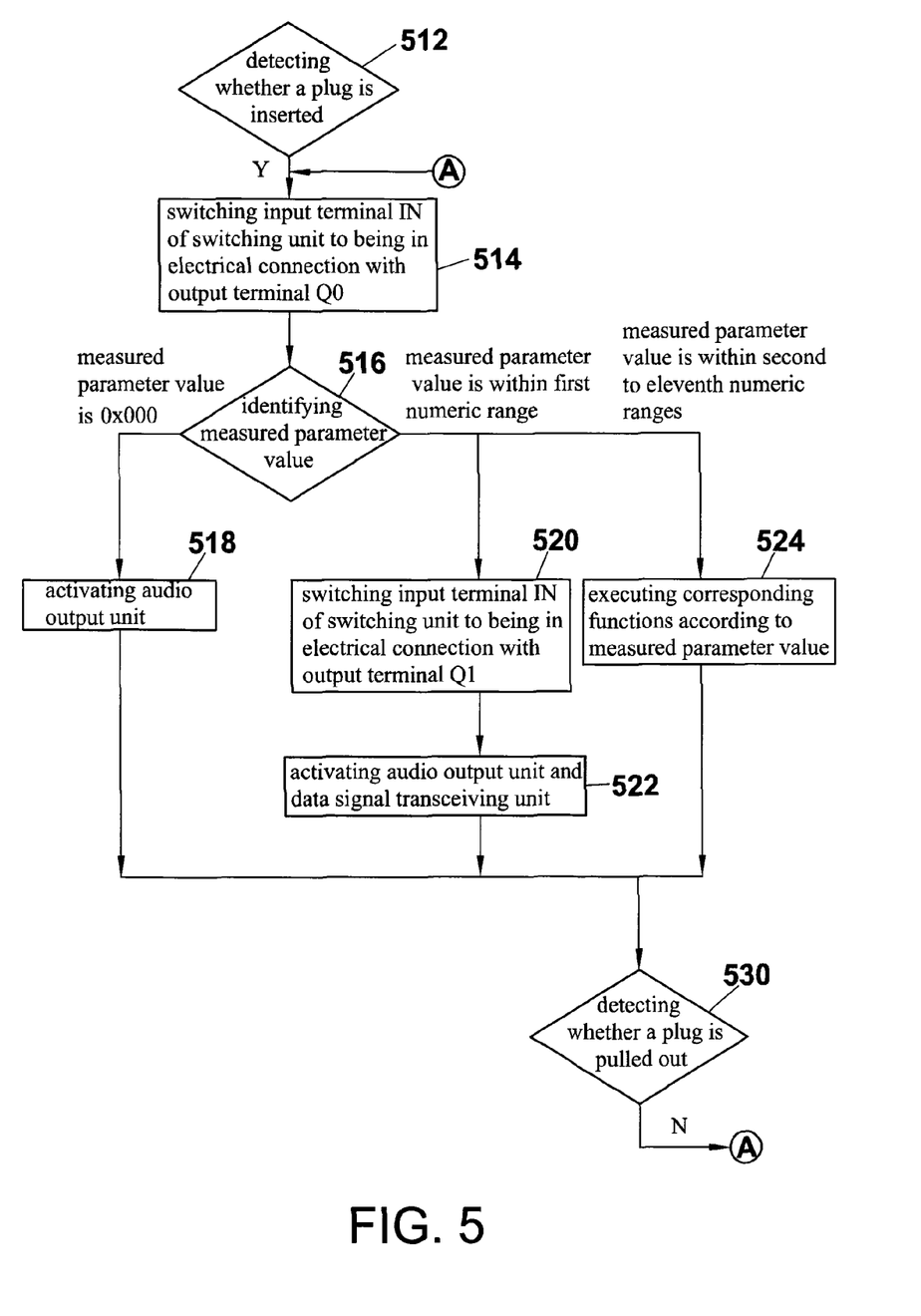
FIG. 5 is a flow chart illustrating the method of identifying an electronic accessory and controlling an electronic device according to the present disclosure.

Referring to FIG. 5, it is a flow chart illustrating the method of identifying an electronic accessory and controlling an electronic device according to the present disclosure. First of all, the insertion detecting unit 221 detects whether the audio jack 210 is inserted with a plug of an electronic accessory every predetermined period of time (step 512). When an insertion of a plug is detected, the input terminal IN of the switching unit 252 is switched to being in electrical connection with the output terminal Q0 to measure the voltage at the contact terminal 218 of the audio jack 210 (step 514). Afterward, the parameter value measured by the measuring unit 227 is identified and compared with the preset data stored in the memory (step 516).

1) When the parameter value measured at the contact terminal 218 of the audio jack 210 by the measuring unit 227 is 0x000, it is identified that the electronic accessory inserted into the audio jack 210 is one that has earphones and no microphone. Subsequently, the audio output unit 223 is activated to output an audio data signal to the earphones of the electronic accessory (step 518).

2) When the parameter value measured at the contact terminal 218 of the audio jack 210 by the measuring unit 227 is within the first numeric range, it is identified that the electronic accessory inserted into the audio jack 210 is one that has earphones and a microphone. Afterward, the input terminal IN of the switching unit 252 is switched to being in electrical connection with the output terminal Q1 (step 520). The audio output unit 223 and data signal transceiving unit 226 are then activated to output an audio data signal to the earphones of the electronic accessory and receive an audio data signal from the microphone (step 522).

3) When the parameter value measured at the contact terminal 218 of the audio jack 210 by the measuring unit 227 is within the second to eleventh numeric ranges, it is identified that the electronic accessory 300 of FIG. 3 is inserted into the audio jack 210 and one of the switches 322 is pressed. Afterward, the processing unit 240 executes a corresponding function according to the parameter value measured by the measuring unit 227 (step 524).

It is to be noted that the insertion detecting unit 221 will continue to detect whether the plug of the electronic accessory is pulled out from the audio jack 210 after the plug has been inserted into the audio jack 210 (step 530). If the insertion detecting unit 221 doe not detect the plug is pulled out, the procedure will go back to step 514 where the input terminal IN of the switching unit 252 is switched to being in electrical connection with the output terminal Q0 to measure the voltage at the contact terminal 218 of the audio jack 210.

It should be noted that the electronic device 200 of the present disclosure may be a mobile phone, smart phone, personal digital assistant (PDA), MP3 player or one with a 2.5 or 3.5 mm standard audio jack. Furthermore, the functions associated with the switches 322 of the control element 320 can be set up based on need and are not limited to what is described herein. For example, the switch SW10 can be designed to answer or hang up a phone call. A press on the switch SW10 can answer a call and a subsequent press on the same switch SW10 will hang up the call.

Although the voltage at the contact terminal 218 of the audio jack 210 is measured to determine what functions should be executed according to the present disclosure, it will be appreciated that other parameter, such as resistance or current can also be measured to determine the functions to be executed. These parameters, including the voltage, resistance and current measured at the contact terminal 218 of the audio jack 210 are all dependent upon the resistances of the contacts of the plug of the electronic accessory and the resistances of the switches 322 of the control element 320. In brief, the voltage, resistance or current measured at the contact terminal 218 will be different thereby determining what functions should be executed when a plug of a different kind of electronic accessory is inserted into the audio jack 210 or a different one of the switches 322 of the control element 320 is pressed.

According to the method of the present disclosure, the parameter, such as voltage, resistance or current can be measured to identify what kind of electronic accessory is inserted into the audio jack. Accordingly, the object of coupling various kinds of electronic accessories with the electronic device to execute the functions thereof can still be achieved by equipping with only one audio jack. In addition, the presses on the switches of the control element of the electronic accessory of the present disclosure will change the resistance measured at the contacts of the plug. Therefore, the measurement of the parameter at the contacts of the plug can identify which one of the switches is pressed. The electronic device then executes a corresponding function associated with the pressed switch according to the measured parameter.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An electronic device connectable with an electronic accessory, the electronic accessory including a microphone and a plug, the plug including a first contact and a second contact, the electronic device comprising:
   a jack configured to receive an insertion of the plug of the electronic accessory, and including a first contact terminal configured to be in contact with the first contact of the plug and a second contact terminal configured to be in contact with the second contact of the plug;
   an audio receiving unit configured to receive from the microphone of the electronic accessory a voice data signal through the first contact terminal of the jack when the plug is inserted into the jack;
   an audio output unit configured to output an audio data signal;
   a measuring unit configured to measure a parameter through the first contact terminal when the plug is inserted into the jack;
   a switching unit configured to selectively connect the first contact terminal of the jack electrically to the audio receiving unit or the measuring unit;
   a processing unit electrically connected to the measuring unit; and
   an insertion detecting unit electrically connected to the processing unit and configured to detect whether the plug of the electronic accessory is inserted into the jack,
   wherein the insertion detecting unit is further configured to generate a control signal to the processing unit when the insertion detecting unit detects the insertion of the plug into the jack,
   wherein the processing unit is configured to control the switching unit according to the control signal so as to electrically connect the first contact terminal of the jack to the measuring unit, wherein when the parameter measured by the measuring unit through the first contact terminal has a first predetermined value, the audio output unit outputs the audio data signal to the electronic accessory through the second contact terminal of the jack, wherein when the parameter measured by the measuring unit through the first contact terminal has a second predetermined value, the processing unit executes a corresponding function, and wherein when the parameter measured by the measuring unit through the first contact terminal has a third predetermined value, the processing unit controls the switching unit to electrically disconnect the first contact terminal of the jack from the measuring unit and to switch a connection of the first contact terminal of the jack to the audio receiving unit so that the audio receiving unit receives the voice data signal through the first contact terminal of the jack from the microphone of the electronic accessory.

2. The electronic device as claimed in claim 1, wherein the audio data signal includes a voice data signal or a music data signal.

3. The electronic device as claimed in claim 1, wherein the parameter is one selected from the group consisting of a voltage, a resistance, and a current.

4. The electronic device as claimed in claim 1, wherein the measuring unit is further configured to convert the measured parameter into a digital value and the processing unit is configured to execute the corresponding function according to the digital value.

5. The electronic device as claimed in claim 1, wherein the first, second and third predetermined values are different from each other.

6. The electronic device as claimed in claim 5, wherein the first predetermined value is 0x000, the second predetermined value is within a first numeric range and the third predetermined value is within a second to eleventh numeric ranges.

7. A method of identifying an electronic accessory for an electronic device and controlling the electronic device, the electronic device comprising a measuring unit, a switching unit, an audio receiving unit, an audio output unit, a processing unit, an insertion detecting unit and a jack, the jack including a first contact terminal and a second contact terminal, the method comprising:

detecting, by the insertion detecting unit, whether a plug of the electronic accessory is inserted into the jack;

generating, by the insertion detecting unit a control signal to the processing unit when the insertion detecting unit detects the insertion of the plug into the jack;

controlling the switching unit, by the processing unit, according to the control signal to electrically connect the first contact terminal of the jack to the measuring unit;

measuring, by the measuring unit, a parameter through the first contact terminal;

when the parameter measured by the measuring unit through the first contact terminal has a first predetermined value,
outputting, by the audio output unit, an audio data signal to the electronic accessory through the second contact terminal of the jack;

when the parameter measured by the measuring unit through the first contact terminal has a second predetermined value,
executing a corresponding function, by the processing unit; and when the parameter measured by the measuring unit through the first contact terminal has a third predetermined value,
controlling the switching unit, by the processing unit, to electrically disconnect the first contact terminal of the jack from the measuring unit and to switch a connection of the first contact terminal of the jack to the audio receiving unit, and
receiving a voice data signal, by the audio receiving unit, through the first contact terminal from a microphone of the electronic accessory.

8. The electronic device as claimed in claim 7, wherein the first, second and third predetermined values are different from each other.

9. The electronic device as claimed in claim 8, wherein the first predetermined value is 0x000, the second predetermined value is within a first numeric range and the third predetermined value is within a second to eleventh numeric ranges.

* * * * *